United States Patent
Ruhl et al.

(10) Patent No.: US 6,440,596 B1
(45) Date of Patent: Aug. 27, 2002

(54) SOLID-OXIDE FUEL CELL HOT ASSEMBLY

(75) Inventors: Robert C. Ruhl, Cleveland Heights; Christopher E. Milliken, South Euclid; Michael A. Petrik, Highland Heights, all of OH (US)

(73) Assignee: Technology Management, Inc., Cleveland, OH (US)

( * ) Notice: Subject to any disclaimer, the term of this patent is extended or adjusted under 35 U.S.C. 154(b) by 0 days.

(21) Appl. No.: 09/425,114

(22) Filed: Oct. 20, 1999

(51) Int. Cl.[7] .......................... H01M 2/00; H01M 2/08; H01M 8/04; H01M 8/12; H01M 2/14

(52) U.S. Cl. .................. 429/34; 429/26; 429/37; 429/38

(58) Field of Search ...................... 429/12, 34, 13, 429/26, 38, 37

(56) References Cited

U.S. PATENT DOCUMENTS

| | | | | |
|---|---|---|---|---|
| 4,243,731 A | * | 1/1981 | Cheron | 429/13 |
| 4,395,468 A | * | 7/1983 | Isenberg | 429/31 |
| 4,508,793 A | * | 4/1985 | Kumata et al. | 429/25 |
| 4,621,033 A | * | 11/1986 | Tsutsumi et al. | 429/12 |
| 4,714,661 A | | 12/1987 | Kaun et al. | 429/14 |
| 4,808,491 A | | 2/1989 | Reichner | 429/13 |
| 5,047,299 A | | 9/1991 | Shockling | 429/20 |
| 5,116,696 A | | 5/1992 | Barp | 429/26 |
| 5,143,800 A | * | 9/1992 | George et al. | 429/20 |
| 5,198,312 A | | 3/1993 | Irino et al. | 429/26 |
| 5,212,023 A | | 5/1993 | Diethelm | 429/26 |
| 5,338,622 A | | 8/1994 | Hsu et al. | 429/26 |
| 5,366,819 A | | 11/1994 | Hartvigsen et al. | 429/17 |
| 5,376,472 A | | 12/1994 | Hartvigsen | 429/20 |
| 5,426,002 A | | 6/1995 | Matsumura et al. | 429/20 |
| 5,480,738 A | | 1/1996 | Elangovan et al. | 429/32 |
| 5,498,487 A | | 3/1996 | Ruka et al. | 429/20 |
| 5,501,781 A | | 3/1996 | Hsu et al. | 204/269 |
| 5,518,827 A | | 5/1996 | Matsumura et al. | 429/19 |
| 5,527,631 A | | 6/1996 | Singh et al. | 429/20 |
| 5,612,149 A | | 3/1997 | Hartvigsen et al. | 426/26 |
| 5,635,039 A | | 6/1997 | Cisar et al. | 204/252 |
| 5,750,278 A | | 5/1998 | Gillett et al. | 429/24 |
| 5,998,053 A | | 12/1999 | Diethelm | 429/14 |

FOREIGN PATENT DOCUMENTS

| | | | | |
|---|---|---|---|---|
| EP | 222880 B1 | 5/1987 | | C25D/5/02 |
| EP | 473540 B1 | 3/1992 | | H01M/8/04 |
| EP | 530451 B1 | 3/1993 | | H01M/8/24 |
| EP | 549695 B1 | 7/1993 | | H01M/8/24 |

* cited by examiner

*Primary Examiner*—Stephen Kalafut
*Assistant Examiner*—Julian A. Mercado
(74) *Attorney, Agent, or Firm*—Renner, Kenner, Greive, Bobak, Taylor & Weber

(57) ABSTRACT

An electrochemical apparatus including a steam reformer (24) positioned on top of a vaporizer (22) and communicating with a mixing orifice (34), the steam reformer (24) having a conductive output end plate (48) defining a fuel orifice (42); a compact cell stack (12) defining at least one air passage (54) and a fuel passage (46), wherein the fuel passage communicates with the fuel orifice (42); a stack end plate (50), defining at least one air orifice (52) communicating with the air passage (52); an electrically insulated sealing ring (58) extending upwardly from the stack end plate (50) outside the air orifice (52); an annular cap (60) defining a hot air inlet (61), extending inwardly beyond a sealing ring (58); a can (62) extending downwardly defining an exhaust passage (32) and communicating with an exhaust vent (66) within a base (16); a porous thermal insulation (56) defining a hot air plenum (68), a pin hole sheet (72) surrounding the can (62) and spaced inwardly from the enclosure (14) to define a cold air plenum (74), wherein the cold air plenum (74) receives coolant air from a coolant supply via a coolant inlet, and the pin hole sheet (72) is provided with a pattern of perforations adapted to distribute the coolant uniformly around the circumference and along the height of the stack (12).

35 Claims, 2 Drawing Sheets

SOLID-OXIDE FUEL CELL HOT ASSEMBLY

TECHNICAL FIELD

The present invention is directed to an electrochemical apparatus such as solid-oxide electrolyte fuel cells and fuel cell assemblies for directly converting chemical energy into electricity. More particularly, it is directed to a fuel cell assembly incorporating a thermally integrated vaporizer-reformer.

BACKGROUND OF THE INVENTION

Fuel cells offer many advantages over conventional power generation systems. It is generally known that such devices are capable of delivering high quality electric power with greater efficiency and lower emissions when compared to comparably sized gas or diesel fueled generators. Further, such systems are generally modular and can fulfill a wide range of energy needs including remote site power generation, light utility, and transportation applications as well as commercial cogeneration and residential applications.

Solid oxide fuel cells are well-known devices that are capable of producing electric power at higher efficiency. However, there are a number of major hurdles including issues of operation, scale, and cost.

Known solid oxide fuel cells operate by the introduction of air into the cathode and the ionization of oxygen at the cathode/electrolyte surface. The oxygen ions move across the gas non-permeable electrolyte to the anode interface, where they react with the fuel gas flowing into the anode releasing heat and giving up their electrons to the anode. The electrons pass through the anode and separator into the next adjacent cathode.

A wide variety of fuels can be used in the electrochemical apparatus of the present invention, including hydrogen, carbon monoxide, alcohols, ammonia, methane, and gaseous- or liquid-hydrocarbon mixtures. The oxidizer gas to, be supplied to the cathode can be oxygen or an oxygen containing gas such as air.

Reformation, such as steam reformation, of carbon-containing fuels is necessary to prevent solid carbon deposition ("coking") at the high solid-oxide stack operating temperatures and also to minimize local stack temperature variations. The output fuel gas ("syngas") from a reformer intended for a solid-oxide fuel cell will preferably comprise chiefly hydrogen, steam, carbon monoxide, carbon dioxide, (optional) nitrogen, and contain less than about 5 percent of methane. In most cases, the reformer must be preceded by a vaporizer to vaporize water and liquid fuel (if used) followed by a mixer to mix the steam with the fuel gas and/or vapor.

Adding the vaporizer and reformation steps to the energy conversion process adds to the cost and size of the unit. The required heat input for vaporization and reforming may be obtained from the surplus heat from the fuel cell stack operation and/or using burners or partial oxidation of the fuel stream.

Many different types of vaporizers and reformers exist in the prior art, but, known designs contain their own disadvantages. These disadvantages include bulky subassembly designs, short operating times between required cleaning, and high equipment cost. Many systems rely on partial-oxidation reforming or burners as a heat source, thereby reducing overall system fuel efficiency. Finally, many of the known reformers can produce syngas having high methane content, leading to large temperature variations in the fuel cell stack (cold spots occur when high-methane syngas contacts cells) which tend to reduce both stack power and its operating life.

Thus, electrochemical apparatus incorporating a thermally integrated vaporizer-reformer capable of high fuel to electric power efficiency is desirable. It is further desirable to create an electrochemical apparatus incorporating a thermally integrated vaporizer reformer, which is compact, low in cost, requires infrequent cleaning or maintenance, and produces a fuel gas mixture containing low methane levels.

SUMMARY OF THE INVENTION

The present invention is an electrochemical apparatus incorporating a thermally integrated vaporizer and fuel steam reformer.

It is an object of the present invention to produce an electrochemical apparatus incorporating a thermally integrated vaporizer and reformer that has a long operating life, and is of moderate size, weight, and cost.

It is another object of the present invention to provide an electrochemical apparatus with a high fuel to electric power efficiency.

It is another object of the present invention to provide an electrochemical apparatus that is compact, light weight, and can be mass produced.

The present invention provides an electrochemical apparatus including a steam reformer connected to a gaseous or vaporized fuel supply and a vaporized water supply by at least one feed tube; the steam reformer having a mixing orifice and a fuel orifice, wherein the mixing orifice is adapted to receive and mix vaporized water and fuel; a fuel cell stack positioned adjacent the steam reformer and having an air passage, and a fuel passage communicating with the fuel orifice; an annular cap positioned above the fuel cell stack and spaced apart from the stack by a sealing ring, wherein the annular cap and the sealing ring define an air inlet communicating with the air passage and adapted to channel air into the air passage; a can extending downwardly from the annular cap spaced apart from the fuel cell stack and steam reformer defining an exhaust passage therebetween; an enclosure surrounding and spaced apart from the can defining an open space therebetween which is at least partially filled with insulation; and at least one coolant inlet formed within the enclosure for receiving coolant from a source. The coolant can be the oxidizing gas.

The present invention further provides an electrochemical apparatus including an enclosure having a base, a top, and an outer wall extending therebetween; a vaporizer positioned generally centrally of the base, the vaporizer including a mixing orifice; at least one feed tube extending through the base into the vaporizer; a steam reformer positioned on top of the vaporizer and communicating with the mixing orifice, the steam reformer having a conductive output end plate defining a cell stack fuel orifice; a compact cell stack located above the steam reformer, the cell stack having at least one air passage and a fuel passage, wherein the fuel passage communicates with the fuel orifice; a stack end plate closing the cell stack, the end plate having at least one air orifice in communication with the air passage; an electrically insulated sealing ring extending upwardly from the stack end plate outside the air orifice; an annular cap mounted on top of the sealing ring and having a hot air inlet, wherein the cap extends radially outward beyond the sealing ring; a can extending downwardly from the annular cap to the base defining an exhaust passage between the cell stack and the can, which communicates with an exhaust vent (preferably annular) within the base; a porous thermal insulation surrounding and spaced apart from the can defining a hot air plenum therebetween; a pin hole sheet surrounding the can defining an open space and spaced inwardly from the enclosure to define a cold air plenum therebetween, wherein the cold air plenum receives coolant air from a coolant supply via a coolant inlet, and the pin hole sheet is provided with a pattern of perforations adapted to distribute the coolant uniformly around the circumference and along the height as desired.

The present invention further provides an electrochemical apparatus including a steam reformer having a mixing orifice, the mixing orifice being adapted to receive and mix vaporized water and fuel; a first end plate adjacent to the steam reformer, the first end plate having a fuel inlet in communication with the steam reformer, and at least one air inlet conduit in communication with an air supply; a solid oxide fuel cell stack positioned adjacent to the first end plate, and having an air passage in communication with the air conduit, and a fuel passage communicating with the fuel orifice; an electrically conductive second end plate mounted adjacent to the stack opposite the first end plate; a conducting element extending from the second end plate; a first cylindrical wall extending upwardly from the first end plate spaced from the cell stack defining an annular chamber therebetween; a second cylindrical wall extending from the first end plate opposite the first cylindrical wall and spaced apart from the steam reformer, defining an exhaust passage therebetween, at least one exhaust port formed within the first end plate, wherein the exhaust port communicates with the annular chamber and the exhaust passage, an enclosure surrounding and spaced apart from the first and second cylindrical walls defining an open space therebetween, wherein the open space is at least partially filled with insulation and wherein the enclosure defines an annular exhaust exit communicating with the exhaust passage; and a chamber extending outwardly from the enclosure defining a cold air plenum; wherein, the cold air plenum communicates with the open space and a coolant supply. The coolant can be the oxidizing gas.

The present invention further provides and electrochemical apparatus including a steam reformer having a mixing orifice and a fuel orifice, the mixing orifice being adapted to receive and mix vaporized water and fuel; a first end plate adjacent to the steam reformer, the first end plate having a fuel inlet communicating with the fuel orifice and at least one exhaust conduit; a cylindrical wall extending from the first end plate surrounding the steam reformer and spaced therefrom defining an exhaust passage therebetween, wherein the exhaust passage is in communication with the exhaust conduit; a solid oxide fuel cell stack sandwiched between the first end plate and a second end plate; said solid oxide fuel cell stack defining at least one exhaust passage in communication with the exhaust conduit and a fuel passage communicating with the fuel orifice; porous insulation surrounding the solid oxide fuel cell stack and spaced therefrom defining a hot air plenum therebetween; an enclosure surrounding said porous insulation wherein said enclosure defines an exhaust exit registerable with the exhaust passage, and wherein the enclosure is in communication with an oxidant gas supply.

DETAILED DESCRIPTION OF THE PREFERRED EMBODIMENT

The present invention is an electrochemical apparatus incorporating a thermally integrated vaporizer and fuel steam reformer with a solid oxide fuel cell stack. The electrochemical apparatus will be referred to generally by the numeral 10 in the accompanying figures.

Figure 1:
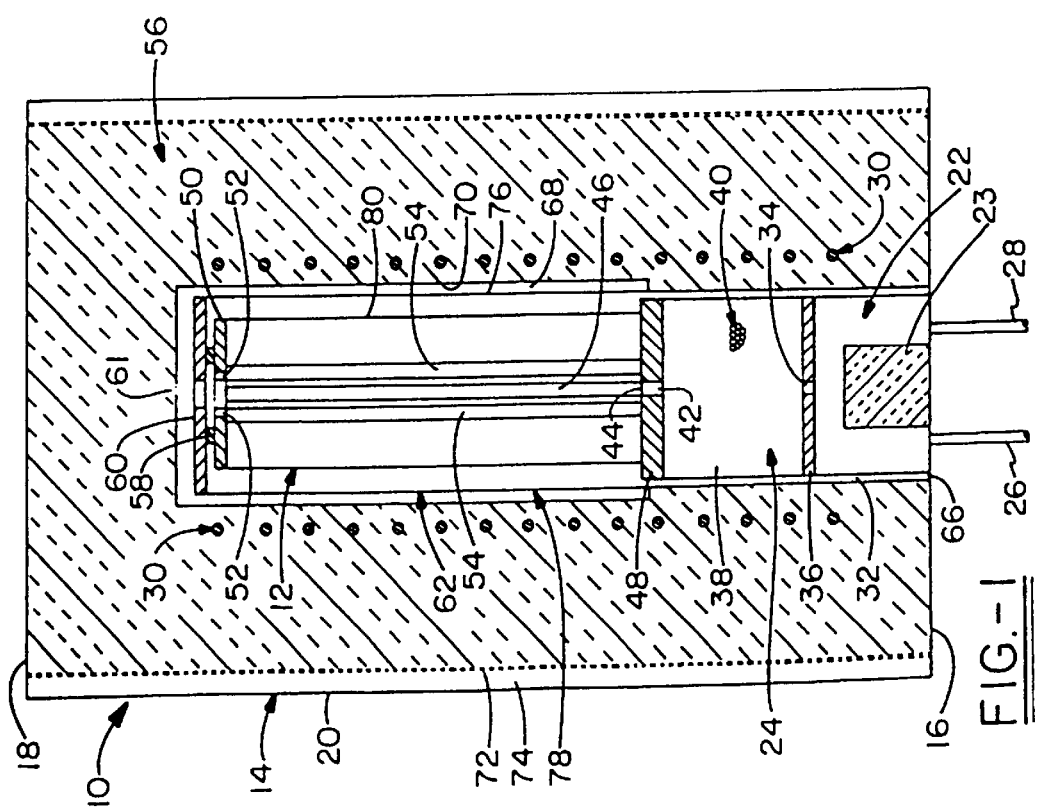
FIG. 1 is a schematic cross-section of an embodiment of the apparatus in which air is fed to the end of the fuel cell stack opposite the end from which the fuel gas is fed.

Referring to FIG. 1, the fuel stack 12 is located within an enclosure 14. As shown, the enclosure 14 is a cylindrical body having a base 16, a top 18, and a cylindrical outside wall 20. Within the enclosure 14, a vaporizer 22 is located at about the center of the enclosure's base 16. As shown vaporizer 22 may be provided with a pad 23 of insulation located centrally within the vaporizer 22. A steam reformer 24 rests on top of the vaporizer 22, and the fuel cell stack 12 is mounted above the reformer 24. Fuel and water enter the vaporizer through tubes 26, 28.

Initially the vaporizer 22 is heated by electric heaters 30 that at least partially surround the vaporizer 22, steam reformer 24, and cell stack 12, and once the reaction starts exhaust gases passing through the annular passage 32 (discussed below) heat the vaporizer 22 and reformer 24. A mixing orifice 34 is formed within the top 36 of the vaporizer 22 and connects the vaporizer 22 to the adjacent steam reformer 24. Gaseous or vaporized fuel and vaporized water mix within the mixing orifice 34 and enter the steam reformer 24. The steam reformer 24 defines a cylindrical chamber 38. This chamber 38 is filled with beads or pellets 40 of a suitable steam reforming catalyst. The fuel and water vapor mixture reacts with the aid of the catalyst beads 40 to produce syngas fuel. This syngas fuel exits the steam reformer 24 and passes into the cell stack 12 via a fuel orifice 42 within the top of the steam reformer 24. The steam reformer 24 may contain baffles (not shown) to create a more uniform flow of the gas through the reformer 24. The fuel orifice 42 is registerable with the inlet 44 of a fuel passage 46 formed within the fuel cell stack 12. This passage 46 carries the syngas fuel through the stack 12 and to each cell anode.

The cell stack 12 is bound at each end by electrically-conductive end plates 48 and 50. End plate 48 is an annular plate containing the fuel orifice 42. One power connection to the stack 12 is made via end plate 48, which is connected, such as by welding, to part of the enclosure 14. End plate 50 defines a pair of air orifices 52 that communicate with the two internal air passageways 54 formed within the fuel cell stack 12. Welded to end plate 50 is a heat-resistant power rod (not shown), which conducts electric power from the stack 12 through an insulation layer 56. An annular electrically insulating seal ring 58 extends from the end plate 50, outside of the air orifice 52, to a cap 60 on can 62. Can 62 has a central hot air inlet or throughway 61 for channeling oxidant gas to the passages 54. Can 62 is essentially a cylindrical wall extending downwardly from cap 60. It should be understood that any wall-like structure capable of enclosing the cell stack and other components could act as a can 62. The can 62 surrounds and defines annular exhaust passage 32, around the stack 12, and the reformer 24, and vaporizer 22. Exhaust passage 32 terminates in an annular exhaust vent 66 formed within the base. Hot gases 130 (see FIG. 4) expelled from the cell stack 12 are received within the exhaust passage 32 and channeled downwardly through the exhaust passage 32 and out the exhaust vent 66.

If necessary, electrically insulating spacers, such as mullite tubes, can be installed between the can 62 and the stack 12 to maintain the open space and prevent possible shorts from contact between them. Surrounding the can 62 for part of its length is a hot air plenum 68, bounded by the can 62 and the inside surface 70 of the permeable thermal insulation 56, that allows air warmed by heat from the hot can 62 to flow to the air inlet 61. The warmed air is then channeled through the stack air inlets 52 in the top plate 50 and into the air passages 54 of the fuel cell stack 12.

One or more electrical start up heaters 30 surround the can 62 outside the exhaust passage 32. A cylindrical perforated or pinhole sheet 72 surrounds the can 62 and heaters 30. The pinhole sheet 72 is provided with a plurality of holes (not shown) that channel air from a cold air plenum 74 (described below) into and through the porous insulation 56. This airflow circulates and receives heat energy both from passing through the insulation 56 and by convection from the can surface 76. To minimize local temperature variations along the length of the stack 12, the hole pattern in the pinhole sheet 72 is chosen to channel greater amounts of coolant air to the hotter regions of the cell stack 12.

The entire apparatus is encased in the airtight enclosure 14. As shown in FIG. 1, the enclosure 14 is spaced from the cylindrical pinhole sheet 72 to define a cold air plenum 74, which is fed cold air via an inlet tube (not shown). The inner assembly 78, consisting of all items from the vaporizer 22 to the top plate may be held tightly against the seal ring 58 by a spring or similar biasing apparatus (not shown).

During operation, the assembly 78 is initially preheated by the electrical start up heater(s) 30. These heaters heat the incoming air within and also the fuel and water entering the vaporizer 22 through tubes 26 and 28. The heated air in the hot air plenum 68 then enters the air passages 54 formed within the cell stack 12. At the same time, the heaters 30 continue to act upon the water and fuel as they vaporize and then mix with each other in the mixing orifice 42 and react with the aid of the catalyst pellets 40 in the steam reformer 24 to form syngas fuel. The fuel gas then enters the fuel cell stack 12 through fuel inlet 42. Once inside the stack 12, the air and fuel react creating an electrical current. The reactant-depleted fuel and air eventually exit at the stack surface 80 where the remaining fuel is combusted by the oxygen from the exiting partially-depleted air. The exiting exhaust gas is expelled through the exhaust plenum 32.

To thermally contain the reactions within the stack 12, cold air is blown into the cold air plenum 74. This cooling air passes from the cold air plenum 74 through the pinhole sheet 72 into the permeable thermal insulation 56. As it passes through the thermal insulation 56, the cold air receives heat radiated from the fuel cell stack 12 via the can 62. The cooling air absorbs excess heat energy, maintaining the stack 12 at the desired substantially constant temperature. The absorbed heat heats the air close to the stack operating temperature. This heated air is received and collected in the hot air plenum 68 and forced through the throughway 61, in the can 62, into the air inlets 52 and finally into the fuel cell stack air passages 54. At the same time, water and fuel entering into the feed tubes 26, 28 are vaporized, and then mix with one another in the mixing orifice 42.

Hot exhaust gas flows through the narrow exhaust annular passage 32 adjacent to the steam reformer 24 and vaporizer 22. Heat from the exhaust gases heats these chambers to their operating temperatures. A wide operating turndown capability is achieved through the use of this proportional-flow heat exchange. At very low stack power levels (when heat losses to the surroundings become a larger fraction of total heat generated), the startup heaters 30 may be powered at low levels if necessary to maintain the desired stack temperature distribution.

The air flowrate required to maintain the stack at the desired constant temperature will depend chiefly upon stack temperature, stack electrochemical efficiency, heat losses to the environment, and to a lesser extent upon factors such as fuel composition, air and fuel feed temperatures, air humidity, etc. Typical air flows needed are in the range of 2 to 2.5 times the minimum needed to fully oxidize the fuel (that is, 2 to 2.5 times stoichiometric).

The embodiment described herein refers to a single stack fuel cell, however, multiple stacks of fuel cells can be used in any of several different configurations. In one case, the present embodiment is simply repeated in a multiple stack design. For example, a single stack within a nest of stacks is started, and once operation begins, produces heat. This heat in turn heats the adjacent stacks to the appropriate start up temperature, thus, eliminating energy necessary to heat all of the stacks to start up temperature individually with individual heating units. These stacks may be directly adjacent to each other, or disposed with spacing between them to allow the cooling air to flow along surfaces between the individual stacks.

Figure 2:
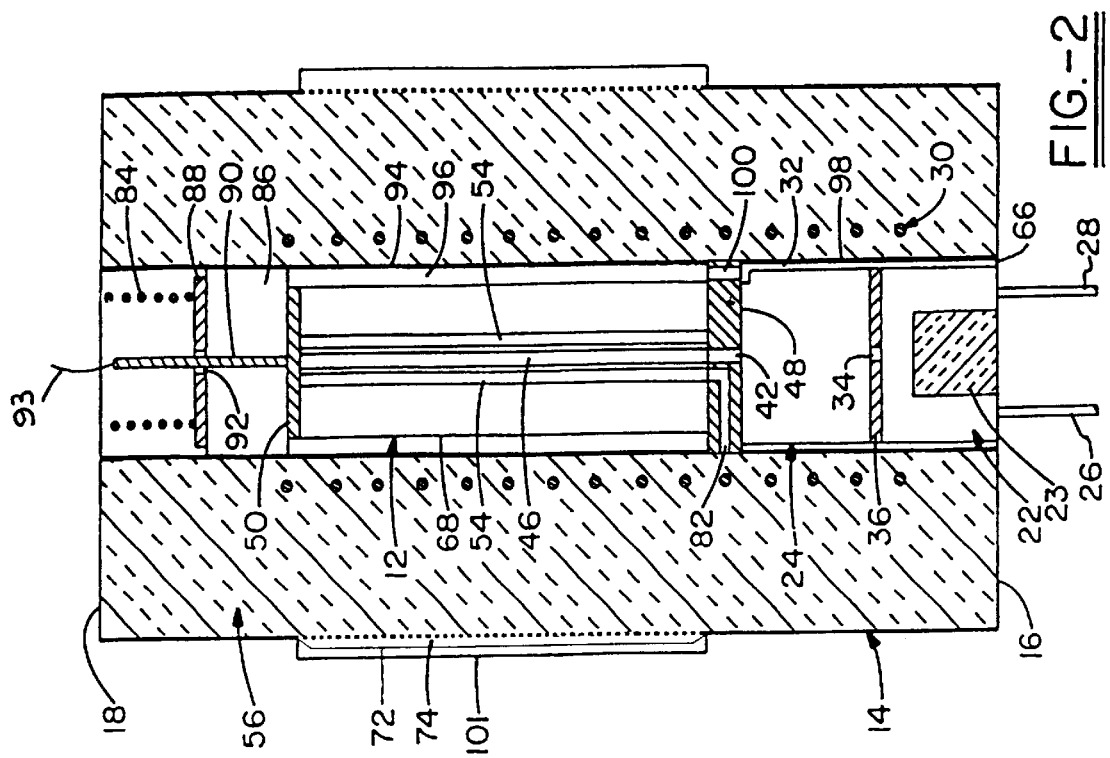
FIG. 2 is a schematic cross-section of a second embodiment of the apparatus in which air is fed to the same end of the stack from which the fuel is fed.

FIG. 2 is a schematic view of a second embodiment of the invention. In this embodiment, the hot air enters the fuel cell stack 12 through conduit 82, formed within the first end plate 48, from the same end as the hot fuel gas. The second end plate 50 is pressed against one end of the stack 12 by a spring 84 or other known biasing means, which transmits force through a freely-moving layer of thermal insulation 86. As shown, the spring 84 has a plate 88 adjacent to its free end. This plate 88 contacts the insulative pad 86. A conducting power rod 90 is welded to the end plate and extends through pad 86 and a hole 92 within the plate 88. The conducting rod 90 is connected to an electrical conductor 93 such as copper wire at its outer end. This wire conducts current produced by the cell stack 12 to the device to be powered or simply a load.

In the second embodiment, a first cylindrical wall 94 extends from first end plate 48 to the top 18 enclosure 14 to which it is sealed. An annular passage 96 is defined between first cylindrical wall 94 and stack 12. Annular passage is bound at one end by insulative pad 86 and communicates with exhaust passage 32 as will be described below. A second cylindrical wall 98 extends from first end plate 48 in the opposite direction of the first wall 94 and seals to the base 16 of enclosure 14. This wall 98 surrounds and is spaced from steam reformer 24 and vaporizer 22 defining narrow exhaust passage 32. The exhaust passage 32 vents outside the outer enclosure 14 though an annular exhaust exit 66. The hot exhaust gas from annular chamber 96 flows into exhaust passage 32 through at least one exhaust port 100 formed within end plate 48. A sleeve 101 defines the cold air plenum 74. Sleeve 101 is mounted to or formed by the side 20 of enclosure 14, and is located at a height equal to the stack 12. Pinhole sheet 72 is located within the open surface of sleeve 101 and sealed to the enclosure 14.

Figure 3:
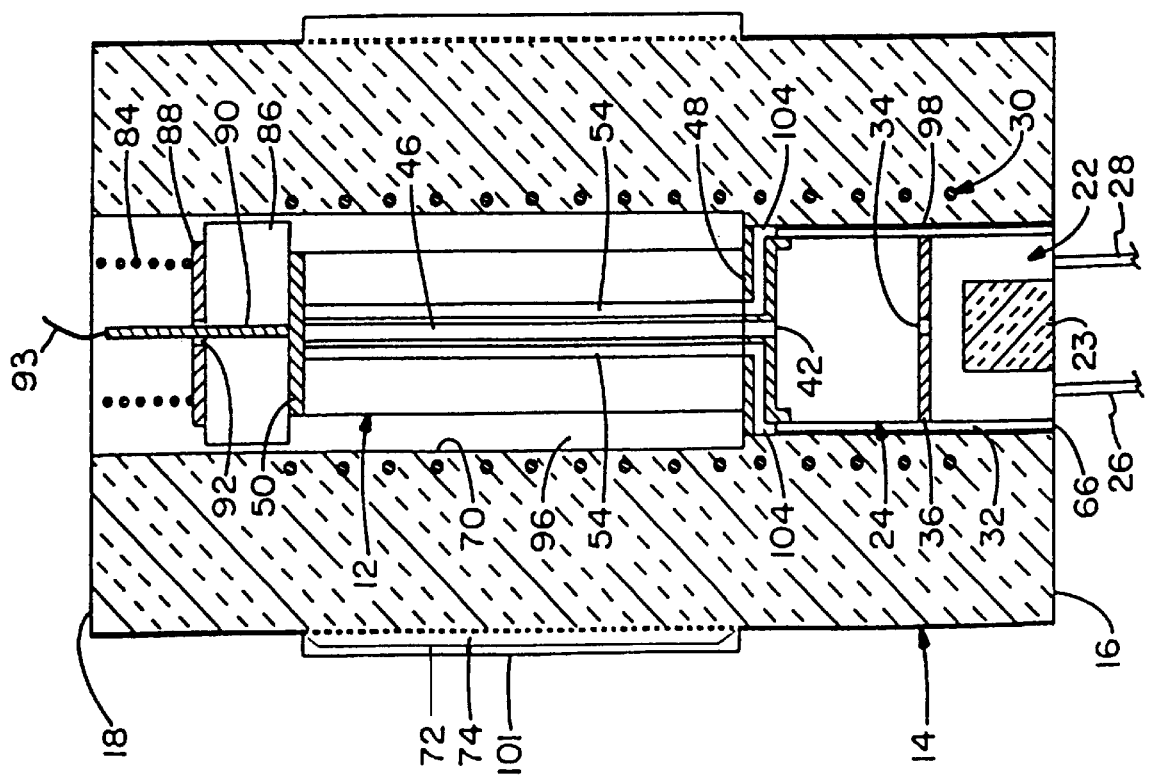
FIG. 3 is a schematic cross-section of a third embodiment of the apparatus in which air is fed to the entire outer surface of the stack.

FIG. 3 shows a schematic view of a third embodiment of the invention. This embodiment incorporates much of the structure shown in embodiment two with the following differences. The incoming air flows through pinhole sheet 72 and insulation 56 where it is heated to high temperature. In this embodiment first wall 94 is omitted and the edge 70 of insulation 56 defines annular chamber 96. The heated air exits insulation 56, and then enters the substantially annular chamber 96 surrounding the stack 12. Near and at the stack surface 80, the air mixes with and reacts with the depleted fuel exiting the stack, thus forming a hot oxygen-rich exhaust gas mixture. This exhaust gas then flows radially inwards through each cell cathode where it gives up some of its oxygen. After flowing through the cell, the exhaust mixture flows along the internal passages 54 within the stack 12, then through exhaust ports or conduits 104 in the first end plate 48 to the exhaust passage 32. The exhaust gas exits the enclosure through exhaust exit 66.

Figure 4:
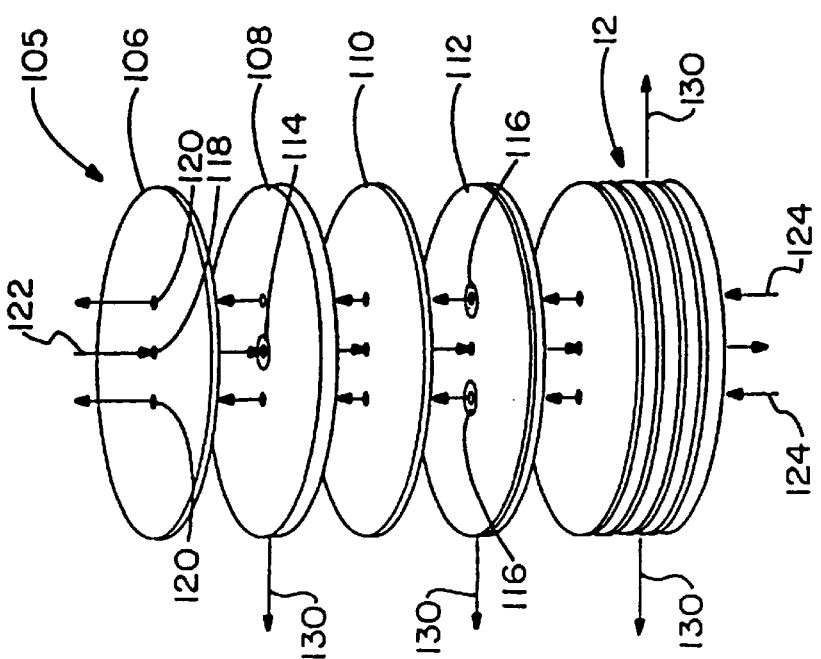
FIG. 4 is a schematic of a fuel cell and a stack of two such cells.

FIG. 4 shows a schematic exploded view of one preferred embodiment of a solid-oxide fuel cell 105 and a stack 12 of two such cells 105, which are contained within the apparatus of the present invention. The cell consists of four stacked layers: a separator 106, a cathode layer 108, an electrolyte 110, and an anode layer 112. Cathode layer 108 and anode layer 112 may be referred to in the general sense as electrodes. A tubular gasket 114 in the cathode layer 108 forms a seal between the separator 106 and electrolyte 110. A pair of tubular gaskets 116 in the anode layer 112 form seals between the electrolyte 110 and separator 106. Gaskets 114 and 116 must remain impervious to fuel and air at the relatively high operating temperature of the cell 105 and be capable of maintaining a good seal under operating conditions. Suitable gaskets 114 and 116 may be made from oxidation resistant metal alloys, such as nickel-base alloys, from ceramics, or from glasses or glass-ceramics having suitable softening temperatures.

The separator 106 contains an internal hole 118 which is aligned with corresponding holes in the other cell layers to form an internal fuel manifold 46 (FIGS. 1–3). It also contains a pair of internal holes 120, which are aligned with corresponding holes in the other cell layers to form a pair of internal air manifolds 54 (FIGS. 1–3). It is within the scope of the invention to include multiple fuel passages and/or oxygen passages in various locations within the cell, preferably close to the centerline of the cell.

A suitable hot fuel gas mixture 122, represented by an arrow, is fed to the internal fuel manifold 46 and hot air 124, represented by arrows, is fed to both internal air manifolds 54. The stack 12 of fuel cells 105 will typically operate at about 850 to 1000° C., but may operate as low as 600° C. with suitable low-temperature solid electrolytes. The separators 106 must be impervious to gases, be good conductors of electrons, and have good long-term compatibility with both the adjacent material and with the air and fuel mixtures. They should also be fairly good conductors of heat. Suitable materials include doped lanthanum chromite or high-temperature metallic alloys, such as RA330, Ducralloy, Inconel 601, or Haynes 230 from Rolled Alloys, Plansee, Inco Alloys International, and Haynes, respectively.

The porous cathode layer 108 is made of a mixed oxide such as strontium-doped lanthanum manganite (LSM). It should have an airflow geometry which produces uniform air distribution with moderate pressure drop at the required flowrate. It may be prepared by conventional ceramic processing procedures, including power pressing, tape casting, extrusion, and the like.

The electrolyte 110 is impervious to gases and is a good oxygen ion conductor while having little or no electronic conductivity. Yttria-doped zirconia having about 3 to 10 mole percent $Y_2O_3$ is preferred. The electrolyte 110 is preferably coated with a thin fired layer of cathode material on the cathode side and anode material on the anode side. The porous anode layer 112 is preferably made of nickel felt, nickel-zirconia cermet, or other nickel-containing cermet or alloy. The gaskets 114, 116 are made of either glass-ceramics or from high-temperature metallic alloys. Cell 105 and stack 12 diameters are typically 50–60 mm and total cell thickness (in use) is typically 1.0–1.5 mm.

When the cells 105 are stacked, a series electrical connection is established among all the cells 105 in the stack 12, such that the stack voltage is the sum of all the cell voltages.

The stack 12 is operated by preheating close to operating temperature, supplying air and fuel gas, and connecting an external electric load. Oxygen from the air is ionized at and near the cathode-electrolyte interface. The oxygen ions flow through the electrolyte 110 under the influence of the chemical potential difference. At and near the electrolyte-anode interface the oxygen ions combine with fuel molecules (chiefly hydrogen and carbon monoxide), releasing electrons which flow into the next cell, and the reaction cycle repeats. Typical power densities are on the order of 150 $mW/cm^2$ of electrode area at typical cell operating voltages near 0.6 volts. Typical stack volumetric power densities are close to 1.0 kilowatt/liter.

In one fuel cell embodiment, shown in FIG. 4, the cathode layer 108 is preferably a porous body having a thickness in the range of about 0.2–0.6 mm, and composed of conventional cathode material, most preferably an oxide having the perovskite crystalline form such as strontium doped lanthanum manganite ($LaMnO_3$), doped calcium manganite ($CaMnO_3$), lanthanum chromite ($LaCrO_3$), lanthanum cobaltite, ($LaCoO_3$), lanthanum nickelite ($LaNiO_3$), lanthanum ferrite ($LaFeO_3$), or mixtures thereof. The cathode 108 may comprise mixed ionic/electronic conductors such as an appropriately doped perovskite oxide. The cathode 108 can be prepared, as described above, or by conventional ceramic processing procedures, for making a flat, planar structure, including pressing a powder, or extruding or tape casting a green body, and sintering either prior to or during the initial operation of the apparatus.

Electrolyte 110 is a thin wafer, less than about 0.4 mm thick, preferably about 0.2 mm or less, of conventional solid oxide fuel cell electrolyte material. Representative electrolytes include zirconia ($ZrO_2$) stabilized with 3 to 10 mole percent of yttria ($Y_2O_3$), doped cerium oxide, doped bismuth oxide, and oxide ion conducting perovskites. Electrolyte 110 is substantially impervious to gases, however, ionized oxygen can migrate through the electrolyte under the influence of an applied oxygen potential.

The quality of the electrical contact between the cathode 108 and the electrolyte 110 may be improved by initially applying a thin layer of substantially the material that comprises the cathode 108 (or is at least electrochemically compatible with the cathode) to the surface of the electrolyte 110 adjacent the cathode 108 in the form of a paint or ink including a volatile vehicle to form an electrical contact zone. Likewise, a paint or ink containing substantially anode material such as nickel or nickel oxide may be applied to the surface of the electrolyte adjacent the anode to form such an electrical contact zone. This electrolyte surface coating may be applied by other conventional techniques also, such as plasma deposition, spin casting, spraying or screen printing.

The thickness of the electrolyte surface coatings is generally on the order of about 1 to less than about 100 microns, and preferably less than 50 microns. It has been found that the thicker this surface coating is applied, the less gas is able to contact the electrolyte 110, and the more tendency there is for the coating to peel off into the cavities of the electrode pores. Unless specifically stated to the contrary, the electrolyte 110 as mentioned in this Specification shall mean the electrolyte 110 with or without either or both cathode and anode material surface coatings.

Anode 112 is a porous body, as described above, and may comprise conventional solid oxide fuel cell anode material. Preferably, the anode 112 comprises either nickel felt or else a finely divided, compressed metallic powder such as nickel blended with a stable oxide powder such as zirconia or cation-doped ceria. As described above regarding the cathode 108, the anode 112 may comprise a mixed conductor, optionally combined with an electronically conducting material. Other examples include ceria which can be doped with an oxide of lanthanum, zirconium or thorium, optionally containing an electronically conducting phase such as Co, Ru, or Pt. The thickness of the anode is preferably about 0.1 mm to about 0.5 mm in thickness. Like cathode 108, anode 112 may be sintered during cell operation or before initial operation in an overheating sintering step.

Other embodiments of the solid oxide fuel cells and its components are disclosed in U.S. Pat. Nos. 5,445,903 and 5,589,285, assigned to the common assignee of the present invention, which patents are hereby incorporated by reference as if fully written out below.

It should be apparent that various embodiments of the present invention accomplish the objects of this invention. It should be appreciated that the present invention is not limited to the specific embodiments described above, but includes variation, modifications, and equivalent embodiments defined by the following claims.

What is claimed is:

1. An electrochemical apparatus comprising:
   a steam reformer communicating with a gaseous or vaporized-liquid fuel supply and a vaporized water supply by at least one feed tube; said steam reformer having a mixing orifice and a fuel orifice, wherein said mixing orifice is adapted to receive and mix vaporized water and fuel; a fuel cell stack positioned adjacent said steam reformer and having an air passage, and a fuel passage communicating with said fuel orifice; an annular cap positioned above said fuel cell stack and electrically insulated from said stack by a sealing ring, wherein said annular cap and said sealing ring define an air inlet in communication with said air passage and adapted to channel air into said air passage; a can extending downwardly from said annular cap spaced from said fuel cell stack and steam reformer, defining an exhaust passage therebetween; an enclosure surrounding and spaced apart from said can defining an open space therebetween which is at least partially filled with insulation; and at least one coolant inlet formed within said enclosure for receiving coolant from a source; and
   wherein the fuel cell stack is electrically connected to an electrical conductor that extends outside the enclosure.

2. The electrochemical apparatus of claim 1, wherein said insulation is mounted over and spaced apart from said cap and can defining a hot air plenum therebetween, wherein said hot air plenum is adapted to receive and collect heat from said fuel cell stack and channel heated air to said air inlet.

3. The electrochemical apparatus of claim 2, further comprising at least one electric heating element adapted to heat incoming fuel, water, and air.

4. The electrochemical apparatus of claim 3, further comprising a perforated sheet located within the enclosure defining a cold air plenum therebetween, wherein said cold air plenum is in communication with said coolant air supply, and said perforated sheet is adapted to channel coolant air into said open space.

5. The electrochemical apparatus of claim 4, wherein the perforated sheet includes a hole pattern adapted to channel a portion of coolant to a hotter region of said fuel cell stack.

6. The electrochemical apparatus of claim 5 further comprising a biasing means operatively contacting said steam reformer and said enclosure, such that, said cell stack is subjected to a compressive force.

7. An electrochemical apparatus comprising:
   an enclosure having a base, a top, and an outer wall extending therebetween;
   a vaporizer positioned generally centrally of said base, said vaporizer including a mixing orifice;
   at least one feed tube extending through said base into said vaporizer;
   a steam reformer positioned on top of said vaporizer and communicating with said mixing orifice, said steam reformer having a conductive end plate having a fuel orifice;
   a cell stack located above said steam reformer, said cell stack having at least one air passage and a fuel passage, wherein said fuel passage is registerable with said fuel orifice;
   a stack end plate closing said cell stack, said stack end plate having at least one air orifice in communication with said air passage;
   an electrically insulated sealing ring extending upwardly from said stack end plate outside said air orifice;
   an annular cap mounted on top of said sealing ring and having a hot air inlet;
   a can extending downwardly from said annular cap and defining an exhaust passage between the cell stack and said can, which communicates with an annular exhaust where within said base;
   porous thermal insulation surrounding and spaced from said can defining a hot air plenum therebetween; and
   a pin hole sheet surrounding said can and spaced inwardly from said enclosure to define a cold air plenum therebetween, wherein said cold air plenum receives coolant from a coolant supply via a coolant inlet, and said pin hole sheet is provided with a pattern of perforations adapted to channel said coolant toward said cell stack; and
   wherein the stack end plate is electrically connected to an electrical conductor that extends outside the enclosure.

8. The electrochemical apparatus of claim 7 further comprising an insulative pad disposed within said vaporizer, wherein said insulative pad at least partially fills said vaporizer.

9. An electrochemical apparatus comprising:
   a steam reformer having a mixing orifice, said mixing orifice being adapted to receive and mix vaporized water and fuel;
   a first end plate adjacent to the steam reformer, said first end plate having a fuel inlet communicating with the steam reformer, and at least one air inlet conduit in communication with an air supply;
   a solid oxide fuel cell stack positioned adjacent to said first end plate and having an air passage in communication with the air conduit and a fuel passage communicating with the fuel orifice;

an electrically conductive second end plate located adjacent to the fuel cell stack opposite the first end plate;

a first cylindrical wall extending upwardly from the first end plate spaced from said cell stack defining an annular passage therebetween;

a second cylindrical wall extending from the first end plate opposite said first cylindrical wall spaced from the steam reformer defining an exhaust passage therebetween; at least one exhaust port formed within said first end plate, wherein the exhaust port communicates with the annular passage and the exhaust passage;

an enclosure surrounding and spaced apart from the first and second cylindrical walls defining an open space therebetween, wherein the open space is at least partially filled with insulation and wherein the enclosure defines an annular exhaust exit in communication with the exhaust passage; and a sleeve extending outwardly from the enclosure defining a cold air plenum;

wherein, the cold air plenum is in communication with the open space and a coolant supply.

10. The electrochemical apparatus of claim 9, further comprising a biasing means extending from the enclosure within the first cylindrical wall;

a plate attached to a free end of the biasing means;

a layer of freely moving insulation between the plate and the second end plate.

11. The electrochemical apparatus of claim 10, wherein the annular passage communicates with the open space.

12. The electrochemical apparatus of claim 9, wherein the conduit is in communication with said open space.

13. The electrochemical apparatus of claim 12, wherein the cylindrical wall is attached to the enclosure.

14. The electrochemical apparatus of claim 9, wherein the conduit communicates with said exhaust passage.

15. The electrochemical apparatus of claim 14, further comprising at least one exhaust port formed within the first end plate and communicating with the annular passage and the exhaust passage.

16. The electrochemical apparatus of claim 9, further comprising a vaporizing chamber positioned adjacent to said steam reformer and in communication with said mixing orifice; and at least one feed tube adapted to carry fuel and water from a source into said mixing chamber.

17. The electrochemical apparatus of claim 16, further comprising an insulative pad mounted inside said vaporizing chamber defining a substantially annular vaporizing space.

18. The electrochemical apparatus of claim 9, further comprising a perforated sheet placed adjacent to said sleeve and sealed to said enclosure.

19. The electrochemical apparatus of claim 18, wherein said perforated sheet includes a hole pattern for distributing coolant air.

20. An electrochemical apparatus comprising:

a steam reformer having a mixing orifice, said mixing orifice being adapted to receive and mix vaporized water and fuel;

a first end plate adjacent to the steam reformer, said first end plate having a fuel inlet communicating with the steam reformer, and at least one air inlet conduit in communication with an air supply;

a solid oxide fuel cell stack positioned adjacent to said first end plate and having an air passage in communication with the air conduit and a fuel passage in communication with the fuel orifice;

an electrically conductive second end plate located adjacent to the fuel cell stack opposite the first end plate;

a first cylindrical wall extending upwardly from the first end plate spaced from said cell stack defining an annular passage therebetween;

a second cylindrical wall extending from the first end plate opposite said first cylindrical wall spaced from the steam reformer defining an exhaust passage therebetween; at least one exhaust port formed within said first end plate, wherein the exhaust port communicates with the annular passage and the exhaust passage;

an enclosure surrounding and spaced apart from the first and second cylindrical walls defining an open space therebetween, wherein the open space is at least partially filled with insulation and wherein the enclosure defines an annular exhaust exit in communication with the exhaust passage;

a sleeve extending outwardly from the enclosure defining a cold air plenum; wherein, the cold air plenum is in communication with the open space and a coolant supply; and a biasing means extending from the enclosure within the first cylindrical wall;

a biasing plate attached to a free end of the biasing means;

a layer of freely moving insulation between the biasing plate and the second end plate; wherein the biasing plate includes a hole and a conducting element extends upwardly from the second end plate through the layer of freely moving insulation and the hole, wherein the conducting element has one end connected to a wire that extends outside the enclosure.

21. The electrochemical apparatus of claim 20, wherein the conduit is in communication with said open space.

22. The electrochemical apparatus of claim 21, wherein the cylindrical wall is attached to the enclosure.

23. The electrochemical apparatus of claim 20, wherein the conduit communicates with said exhaust passage.

24. The electrochemical apparatus of claim 23, further comprising at least one exhaust port formed within the first end plate and communicating with the annular passage and the exhaust passage.

25. The electrochemical apparatus of claim 20, further comprising a vaporizing chamber positioned adjacent to said steam reformer and in communication with said mixing orifice; and at least one feed tube adapted to carry fuel and water from a source into said mixing chamber.

26. The electrochemical apparatus of claim 25, further comprising an insulative pad mounted inside said vaporizing chamber defining a substantially annular vaporizing space.

27. The electrochemical apparatus of claim 20, wherein the annular passage communicates with the open space.

28. The electrochemical apparatus of claim 20, further comprising a perforated sheet placed adjacent to said sleeve and sealed to said enclosure.

29. The electrochemical apparatus of claim 28, wherein said perforated sheet includes a hole pattern for distributing coolant air.

30. An electrochemical apparatus comprising:

a steam reformer having a mixing orifice and a fuel orifice, said mixing orifice being adapted to receive and mix vaporized water and fuel;

a first end plate adjacent to the steam reformer, said first end plate having a fuel inlet communicating with the fuel orifice, and at least one exhaust conduit;

a cylindrical wall extending from the first end plate surrounding the steam reformer and spaced therefrom defining an exhaust passage therebetween, wherein the exhaust passage is in communication with the exhaust conduit;

a solid oxide fuel cell stack sandwiched between the first end plate and a second end plate; said solid oxide fuel cell stack defining at least one exhaust passage in communication with the exhaust conduit and a fuel passage communicating with the fuel orifice;

porous insulation surrounding the solid oxide fuel cell stack and spaced therefrom defining a hot air plenum therebetween;

an enclosure surrounding said porous insulation wherein said enclosure defines an exhaust exit registerable with the exhaust passage, and wherein the enclosure is in communication with an oxidant gas supply; and wherein the second end plate is electrically connected to an electrical conductor that extends outside the enclosure.

31. The electrochemical apparatus of claim 30 further comprising a plurality of heating elements surrounding the fuel cell stack and steam reformer.

32. The electrochemical apparatus of claim 30 further comprising a biasing means operatively engaging the second end plate.

33. The electrochemical apparatus of claim 32 further comprising an insulative pad sandwiched between the biasing means and the second end plate.

34. The electrochemical apparatus of claim 20 further comprising a sleeve located coaxially with the solid oxide fuel cell extending outwardly from the enclosure defining a cold air plenum therebetween; a perforated sheet positioned adjacent to the sleeve and sealed to the enclosure, wherein the sleeve is in communication with the oxidant air supply.

35. The electrochemical apparatus of claim 34, wherein the perforated sheet includes a hole pattern for directing oxidant to the solid oxide fuel cell.

* * * * *